US011468614B2

(12) United States Patent
Kong et al.

(10) Patent No.: US 11,468,614 B2
(45) Date of Patent: *Oct. 11, 2022

(54) PRESENTING MULTIPLE IMAGE SEGMENTATIONS

(71) Applicant: Adobe Inc., San Jose, CA (US)

(72) Inventors: Sarah Aye Kong, Cupertino, CA (US); I-Ming Pao, Palo Alto, CA (US); Hyunghwan Byun, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/214,918

(22) Filed: Mar. 28, 2021

(65) Prior Publication Data

US 2021/0217216 A1    Jul. 15, 2021

Related U.S. Application Data

(63) Continuation of application No. 15/826,162, filed on Nov. 29, 2017, now Pat. No. 10,977,844.

(51) Int. Cl.
*G06T 11/60* (2006.01)
*G06T 7/11* (2017.01)
*G06T 7/194* (2017.01)

(52) U.S. Cl.
CPC .............. *G06T 11/60* (2013.01); *G06T 7/11* (2017.01); *G06T 7/194* (2017.01); *G06T 2200/24* (2013.01); *G06T 2200/28* (2013.01); *G06T 2207/10024* (2013.01); *G06T 2207/20164* (2013.01)

(58) Field of Classification Search
CPC . G06T 11/60; G06T 7/11; G06T 7/194; G06T 2200/24; G06T 2200/28; G06T 2207/10024; G06T 2207/20164
USPC .......................................................... 345/626
See application file for complete search history.

(56) References Cited

U.S. PATENT DOCUMENTS

| 8,170,380 B1 * | 5/2012 | Gilra ....................... G06T 11/60 345/619 |
| 9,418,319 B2 | 8/2016 | Shen et al. |
| 9,563,961 B1 | 2/2017 | Kanagasabai et al. |
| 9,569,697 B1 * | 2/2017 | McNerney ................ G06T 5/00 |
| 10,325,416 B1 | 6/2019 | Scapel et al. |

(Continued)

OTHER PUBLICATIONS

"Final Office Action", U.S. Appl. No. 15/826,162, filed May 22, 2019, 19 pages.

(Continued)

*Primary Examiner* — Jennifer Mehmood
*Assistant Examiner* — Kim Thanh T Tran
(74) *Attorney, Agent, or Firm* — FIG. 1 Patents

(57) ABSTRACT

Methods and systems are provided for presenting and using multiple masks based on a segmented image in editing the image. In particular, multiple masks can be presented to a user using a graphical user interface for easy selection and utilization in the editing of an image. The graphical user interface can include a display configured to display an image, a mask zone configured to display segmentations of the image using masks, and an edit zone configured to display edits to the image. Upon receiving segmentation for the image, the masks can be displayed in the mask zone where the masks are based on a selected segmentation detail level.

20 Claims, 11 Drawing Sheets

(56) References Cited

U.S. PATENT DOCUMENTS

| | | |
|---|---|---|
| 2002/0042038 A1 | 4/2002 | Miller et al. |
| 2005/0114784 A1 | 5/2005 | Spring et al. |
| 2007/0146389 A1 | 6/2007 | Distler |
| 2008/0125892 A1 | 5/2008 | Hoguet |
| 2009/0087035 A1 | 4/2009 | Wen et al. |
| 2012/0216106 A1 | 8/2012 | Casey |
| 2014/0029868 A1* | 1/2014 | Lorenz .................. G06T 11/00 382/302 |
| 2016/0275712 A1 | 9/2016 | Moll et al. |
| 2017/0278308 A1 | 9/2017 | Bleiweiss et al. |
| 2017/0287137 A1 | 10/2017 | Lin et al. |
| 2018/0108137 A1 | 4/2018 | Price et al. |
| 2019/0164322 A1 | 5/2019 | Kong et al. |

OTHER PUBLICATIONS

"Final Office Action", U.S. Appl. No. 15/826,162, filed Mar. 20, 2020, 22 pages.

"Non-Final Office Action", U.S. Appl. No. 15/826,162, filed Sep. 12, 2019, 22 pages.

"Non-Final Office Action", U.S. Appl. No. 15/826,162, filed Oct. 5, 2018, 22 pages.

"Non-Final Office Action", U.S. Appl. No. 15/826,162, filed Jun. 26, 2020, 24 pages.

"Notice of Allowance", U.S. Appl. No. 15/826,162, filed Dec. 11, 2020, 10 pages.

* cited by examiner

PRESENTING MULTIPLE IMAGE SEGMENTATIONS

RELATED APPLICATIONS

This application claims priority as a continuation to U.S. patent application Ser. No. 15/826,162, filed Nov. 29, 2017, and titled "Presenting Multiple Image Segmentations," the entire disclosure of which is hereby incorporated by reference.

BACKGROUND

Images are oftentimes desired to be segmented, for example, to better allow editing of the image. Image segmentation is generally the process of generating a segment of an image. Such a segment can be visualized in an editing environment using a mask that indicates the segmented portion of an image to which edits will be applied as opposed to the portions of the image that will not be affected by edits. A segment can be created along boundaries within an image so that the segment designates an object and/or feature within the image. For instance, in a portrait of an individual, the image can be segmented into a segment of the individual's face or a segment of the background or, if more detail is desired, into a segment of the individual's eyes, a segment of the individual's teeth, a segment of the individual's hair, etc. As such, using a mask for such a portrait can indicate that edits will only be applied to the emphasized portion(s) of the image and not the deemphasized portion(s).

Generating multiple segmentations for an image is a time intensive and tedious process. To generate a single segmentation can take multiple clicks, brush strokes, and/or multiple selection tools and dialogs in an image editing application. Even after such a time consuming process, the resulting segmentation might not include the portion(s) of the image the user was trying to segment in the first place. The segmentation process is further complicated when a user wants to do localized adjustments to multiple areas of an image (e.g., using edits to whiten only the teeth of a person within an image and then using edits to change the saturation of only the sky portion of the image). When making localized adjustments, a user must separately perform segmentation for each portion of the image that the user wishes to edit. Once a segment is created that segmentation can be applied to the image using a mask so the user can apply edits to only the segmented portion of the image. To edit another portion of the image, the user then repeats this whole process by performing segmentation for the new portion of the image and then applying edits using another mask.

Conventional methods for generating and displaying an image segmentation allows a user to utilize selection and masking tools to select an area of an image to create a single selection or mask at a time. If the user wishes to edit another area of the image, the user needs to repeat the process to create another selection or mask. This requires users to perform a serial process and thereby spend an extensive amount of time to apply localized adjustments for different areas of an image. Such methods require that a user repeatedly segment an image. Accordingly, such conventional methods can be costly in time and effort as these methods require a user to repeat the process of selecting portions of an image for editing, generating a mask and then editing the image using the mask.

SUMMARY

Embodiments of the present disclosure are directed towards an image editing system for utilizing multiple masks generated by segmentation of an image to apply edits to portions of the image as designated by selected masks. In accordance with embodiments, such a system can be visualized using a graphical user interface with multiple selectable masks representing various segmentations of the image. Presenting multiple masks for selection allows for easy and intuitive editing of an image using masks to edit corresponding portions of the image. Advantageously, such presentation of masks allows a user to see and visualize the different areas of an image available as possible masks at one time without having to go through step by step mask creation repeatedly in order to select and edit different areas. Editing an image using masks presented in this manner requires less expertise in generating the multiple masks and is significantly less time consuming.

An image editing system can provide multiple masks to a user for easy selection for editing corresponding portions of an image. A selected mask indicates a segmented portion of an image to which an edit(s) will be applied as opposed to the portions of the image that will not be affected by edits. For instance, in a portrait of an individual, the image can be segmented into one or more segments that can be presented using masks, such as foreground (the individual) and background or, if more detail is desired, into segments of the individual's eyes, teeth, hair, etc. In this way, a user can select what portion of the image the user desires to edit using the corresponding mask.

BRIEF DESCRIPTION OF THE DRAWINGS

FIG. 3D depicts an illustrative image editing system for providing available masks for use in editing of an image, in accordance with embodiments of the present disclosure.

DETAILED DESCRIPTION

Oftentimes, users desire for easy editing of images in an image editing system. For instance, users might desire editing that does not require expertise of difficult tools within the editing system or editing that is not highly iterative and time-consuming. One manner in which to edit images is using segmentation. Image segmentation can be used to identify a segment within an image so that the segment can be edited. Such a segment can be visualized in an image editing system using a mask that indicates the segmented portion of the image to which edits will be applied as opposed to the portions of the image that will not be affected by edits. However, creating masks for multiple segments of an image is a time-consuming and tedious process.

With the advancement of technology, deep learning techniques have been implemented that can more quickly segment images. However, even when using deep learning based techniques to generate a segment for an image, only one mask is presented to the user, as conventional methods only allow for visualization and editing using a single mask at a time upon image segmentation. In this way, users are unaware of what portions of an image have corresponding masks that can be used for localized editing of portions of an image. It should be appreciated that conventional methods can allow for using multiple layer masks to apply edits to various portions of an image, however, each mask must be individually generated and then used for applying edits. As such, existing technologies are generally deficient in allowing easy and intuitive editing of an image using masks.

Accordingly, embodiments of the present disclosure are directed to an image editing system for utilizing multiple masks generated using segmentation of an image. These multiple masks can be simultaneously provided to a user, allowing the user to apply edits to portions of the image as designated by selected masks. In particular, and as described herein, multiple masks can be presented to a user for easy selection and utilization in the editing of an image. Such masks presented to a user can be masks likely to be desired by a user for selection and utilization in the editing of an image. Advantageously, such presentation of multiple masks allows a user to visualize at one time the different areas of an image available as possible masks without having to repeatedly go through step by step mask creation in order to select and edit different areas of the image. As such, editing an image using masks presented in this manner is less time consuming and does not require expertise with masking tools and/or generation of masks.

Figure 1A:
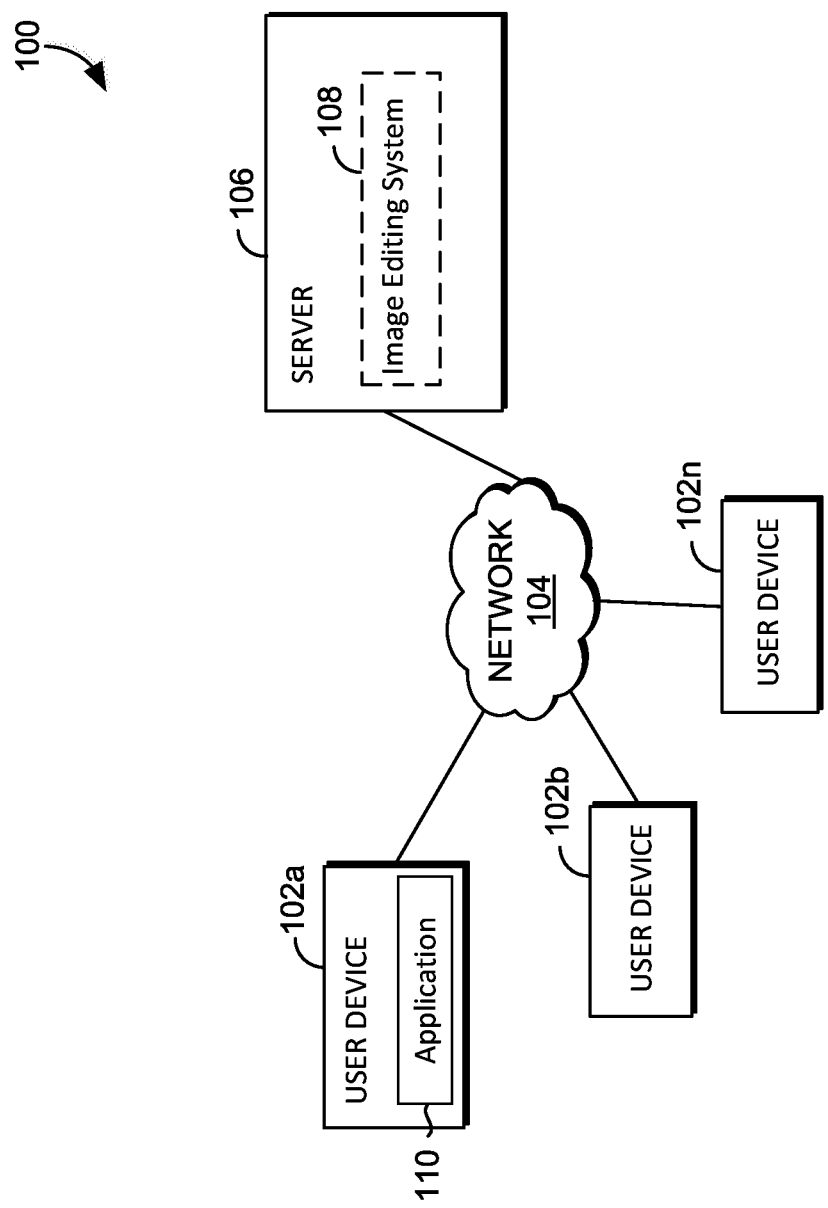
FIG. 1A depicts an example configuration of an operating environment in which some implementations of the present disclosure can be employed, in accordance with various embodiments of the present disclosure.

Turning to FIG. 1A, FIG. 1A depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 7.

It should be understood that operating environment 100 shown in FIG. 1A is an example of one suitable operating environment. Among other components not shown, operating environment 100 includes a number of user devices, such as user devices 102a and 102b through 102n, network 104, and server(s) 106. Each of the components shown in FIG. 1A may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. The network 104 may be any network that enables communication among machines, databases, and devices (mobile or otherwise). Accordingly, the network 104 may be a wired network, a wireless network (e.g., a mobile or cellular network), a storage area network (SAN), or any suitable combination thereof. In an example embodiment, the network 104 includes one or more portions of a private network, a public network (e.g., the Internet), or combination thereof. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out image editing, such as, presenting and utilizing multiple segmentations of an image as masks for use in editing the image. In some implementations, the application(s) comprises a web application, which can run in a web browser, and could be hosted at least partially on the server-side of environment 100. In addition, or instead, the application(s) can comprise a dedicated application, such as an application having image editing and/or processing functionality. For example, such an application can be configured to display images and/or allow the user to input or identify images for editing. In some cases, the application is integrated into the operating system (e.g., as a service). It is therefore contemplated herein that "application" be interpreted broadly. Example applications include Adobe® Photoshop®, LightRoom®, and the like.

In accordance with embodiments herein, application 110 can facilitate segmenting an image, presenting the segmentations as masks, and editing the image using selected masks. In particular, a user can select or input an image or picture for segmentation. An image and/or picture can be selected or input in any manner. The application may facilitate the access of one or more images stored on the user device 102*a* (e.g., in a photo library), and/or import images from remote devices 102*b*-102*n* and/or applications, such as from server 106. For example, a user may take a picture using a camera on a device, for example, user device 102*a*. As another example, a user may select a desired image from a repository, for example, stored in a data store accessible by a network or stored locally at the user device 102*a*. Based on the input image, the input image can undergo segmentation using techniques, some of which are further discussed below with reference to segmentation engine 206 of FIG. 2, and multiple segmentations can be provided to the user via the user device 102*a*. After undergoing segmentation, masks can be used to display the different segmentations to a user. Presenting various available segments as masks allows the user to select one of the provided masks to edit the image. For example, the user can select a foreground segment from the available masks and edit the image to generate a composite image using the mask of the foreground segment and a new background.

The user device can communicate over a network 104 with a server 106 (e.g., a Software as a Service (SAAS) server), which provides a cloud-based and/or network-based image editing system 108. The image editing system may communicate with the user devices and corresponding user interface to facilitate the editing and/or presenting of images by the user via the user device using, for example, application 110.

As described herein, server 106 can facilitate segmenting an image, presenting the segmentations as masks, and editing the image using selected masks via image editing system 108. Server 106 includes one or more processors, and one or more computer-readable media. The computer-readable media includes computer-readable instructions executable by the one or more processors. The instructions may optionally implement one or more components of image editing system 108, described in additional detail below. Server 106 is capable of automatically pre-generating multiple possible masks for images stored on the server by a user. Pre-generating such potential masks ensures that masks are ready when a user ties to edit an image using segmentation, decreasing or eliminating any delay in the process.

For cloud-based implementations, the instructions on server 106 may implement one or more components of image editing system 108. Application 110 may be utilized by a user to interface with the functionality implemented on server(s) 106, such as image editing system 108. In some cases, application 110 comprises a web browser. In other cases, server 106 may not be required, as further discussed with reference to FIG. 1B.

Thus, it should be appreciated that image editing system 108 may be provided via multiple devices arranged in a distributed environment that collectively provide the functionality described herein. Additionally, other components not shown may also be included within the distributed environment. In addition, or instead, image editing system 108 can be integrated, at least partially, into a user device, such as user device 102*a*.

Figure 1B:
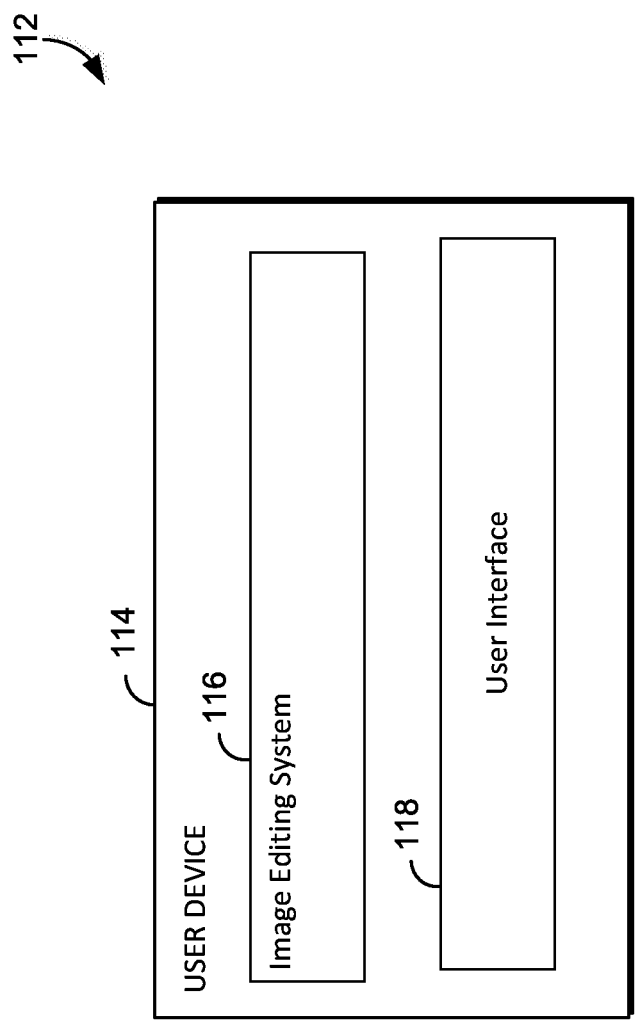
FIG. 1B depicts an example configuration of an operating environment in which some implementations of the present disclosure can be employed, in accordance with various embodiments of the present disclosure.

Referring to FIG. 1B, aspects of an illustrative image editing system are shown, in accordance with various embodiments of the present disclosure. FIG. 1B depicts a user device 114, in accordance with an example embodiment, configured to allow for editing images using segmentation. The user device 114 may be the same or similar to the user device 102*a*-102*n* and may be configured to support the image editing system 116 (as a standalone or networked device). For example, the user device 114 may store and execute software/instructions to facilitate interactions between a user and the image editing system 116 via the user interface 118 of the user device.

A user device can be utilized by a user to facilitate segmenting an image, presenting the segmentations as masks, and editing the image using selected masks. In particular, a user can select or input an image or picture for segmentation utilizing user interface 118. An image and/or picture can be selected or input in any manner. The user interface may facilitate the user accessing one or more images stored on the user device (e.g., in a photo library), and/or import images from remote devices and/or applications. Based on the input image, the input image can undergo segmentation using various techniques, some of which are further discussed below with reference to segmentation engine 206 of FIG. 2, and multiple segmentations can be provided to the user as masks via a user interface. After undergoing segmentation, masks can be used to display the different segmentations to a user via the user interface. Presenting various available segments as masks via the user interface allows the user to select one or more of the provided masks to use in editing the image. For example, the user can interact with the user interface to select a foreground segment from the available masks and edit the image to generate a composite image using the mask of the foreground segment and a new background. Interactions can include mousing over a portion of an image that has an associated mask, clicking on a portion of an image that has an associated mask using a mouse, clicking on a thumbnail representation of a mask, using touch screen capabilities, vocally indicating a selection, and/or other methods of user device interaction. Such interactions can be carried out using a touch screen, a stylus, a mouse, and/or a track pad. It should be appreciated that while image editing system 116 is depicted as a single system, in implementations, the functionality of the system can be performed using additional systems.

Figure 2:
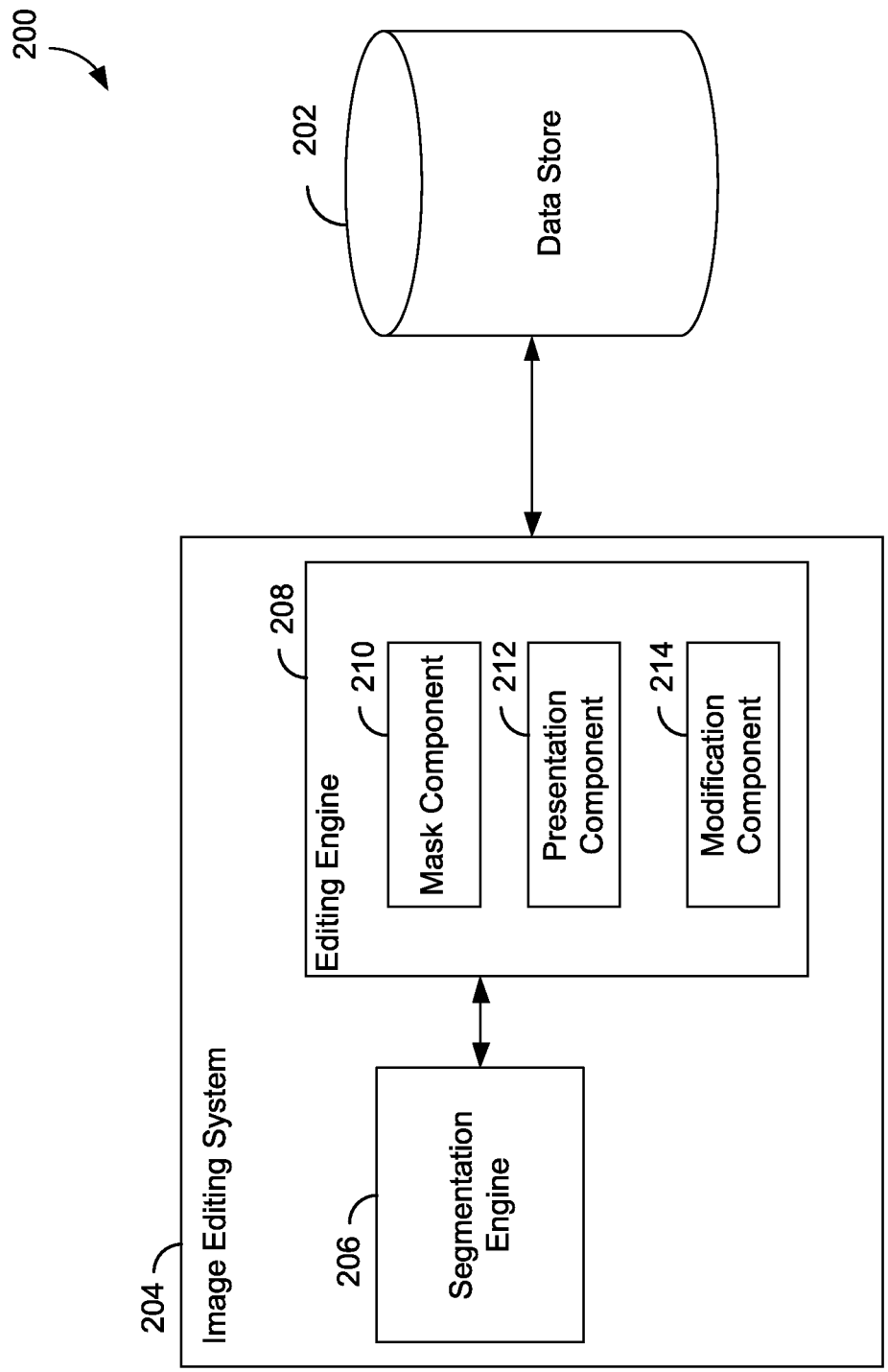
FIG. 2 depicts aspects of an illustrative image editing system, in accordance with various embodiments of the present disclosure.

Referring to FIG. 2, aspects of an illustrative image editing environment 200 are shown, in accordance with various embodiments of the present disclosure. Image editing system 204 includes segmentation engine 206 and editing engine 208. The foregoing engines of image editing system 204 can be implemented, for example, in operating environment 100 of FIG. 1A and/or operating environment 112 of FIG. 1B. In particular, those engines may be integrated into any suitable combination of user devices 102a and 102b through 102n and server(s) 108 and/or user device 114. While the segmentation engine and editing engine are depicted as separate engines, it should be appreciated that a single engine could perform the functionality of both engines. Additionally, in implementations, the functionality of the engines can be performed using additional engines. Further, it should be appreciated that the functionality of segmentation engine can be provided by a system separate from the image editing system. Such an imaging editing system can work in conjunction with data store 202.

Data store 202 can store computer instructions (e.g., software program instructions, routines, or services), data, and/or models used in embodiments described herein. In some implementations, data store 202 can store information or data received via the various engines and/or components of image editing system 204 and provides the various engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data store 202 can be used to store a neural network system capable of being used to segment an image using deep learning techniques, further discussed below with reference to segmentation engine 206. Such a neural network system can be comprised of one or more neural networks.

In embodiments, data stored in data store 202 can include images a user can select for editing using, for example, the image editing system. An image can include a visual representation of a person, object, or scene. Examples of an image can include digital versions of a picture, painting, drawing, and/or photograph. Such images can be input into data store 202 from a remote device, such as from a server or a user device. Data stored in data store 202 can also include segmentations generated for an image. Such segmentations can be stored as multiple segments and/or as masks. Segments can be created along boundaries within an image and/or used to designate objects and/or features within the image. Data stored in data store 202 can further include edited images. Saved edits can include manipulations to an image using a selected segment or mask to apply edits to the corresponding portion of the image.

Image editing system 204 can generally be used for editing images. Specifically, image editing system can be configured for editing images using segmentation. As used herein, image segmentation is the process of partitioning an image into multiple segments such that a segment can be selected for selectively applying edits to only the portion of the image as indicated by the selected segment. Segments can be visualized in an editing environment and/or image editing application using masks that indicate the segmented portion of an image to which edits will be applied as opposed to the portions of the image that will not be affected by edits. In some cases, a mask can highlight a segmented portion of the image to which edits will be applied and darken, blur, fade, or otherwise distinguish the portions of the image that will not be affected by edits. Image editing system can be configured to display multiple masks available that can be used for applying edits to portions of an image based on the segment of the image associated with a selected mask. This image editing system concurrently provides users with multiple masks representing possible segmentations for easy and intuitive editing of an image.

An image can be accessed or referenced by segmentation engine 206 for segmenting the image. In this regard, the segmentation engine 206 may access or retrieve an image selected by a user via data store 202 and/or from a remote device, such as from a server or a user device. As another example, the segmentation engine 206 may receive an image provided to the segmentation engine 206 via a user device. Image segmentation associated with an image can be initiated in any number of ways. For example, such segmentation can take place when a user indicates a desire to select and/or mask an image using, for example, a user interface associated with the image editing system. As another example, image segmentation may be initiated automatically, for instance, upon receiving an image. As described, an image can be segmented in any number of ways, such as, for instance, edge detection, color detection, object detection, etc. By way of example only, an image may be segmented in accordance with identifying a feature(s) or an object(s) within an image.

Such segmentation can be performed using any of a variety of techniques. Such techniques include deep learning techniques, color range or saliency detection, thresholding, clustering methods, compression-based methods, histogram-based methods, edge detection, dual clustering methods, region-growing methods, partial differential equation-based methods, variational methods, graph partitioning methods, watershed transformation, model based segmentation, multi-scale segmentation, and semi-automatic segmentation. Specifically, the deep learning techniques can include instance-level semantic segmentation as described in U.S. application Ser. No. 15/296,845, automatic boundary-aware human cutout as described in U.S. application Ser. No. 15/0886,590, object detection using cascaded convolutional neural networks as described in U.S. Pat. No. 9,418,319, all of which are incorporated by reference, generic algorithms for segmentation such as R-CNN and/or mask R-CNN.

As can be appreciated, any number of segments can be identified or detected. For example, in some implementations, any segments may be identified and ranked, such that only a portion of the identified segments are masked and/or presented.

Upon segmenting an image, the editing engine 208 can be utilized to edit the image in accordance with a selected segment(s). As can be appreciated, in some cases, the image may be segmented immediately preceding editing of the image. In other cases, an image may be segmented and stored accordingly, for example in data store 202, for subsequent editing. As shown, the editing engine 208 can include mask component 210, presentation component 212, and modification component 214. The foregoing components of editing engine 208 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. It should be appreciated that while mask component, presentation component, and modification component are depicted as a separate components, in implementations, the functionality of the system can be performed using a single component and/or additional components.

Generally, the mask component 210 is configured to generate a set of masks for the image in accordance with image segmentations. In this regard, for each image segmentation, a mask may be generated. Masks can be generated based on the saliency of objects in an image, based on objects of an image that likely need to be edited (e.g., based on attributes not meeting a certain threshold), based on boundaries within an image that designate an object and/or feature within the image, or a combination thereof. Initiating mask generation may occur in any number of ways. In some implementations, mask generation may automatically occur upon image segmentation. That is, upon identifying a set of image segmentations (e.g., via segmentation engine 206), a set of corresponding masks may be automatically generated. In other implementations, masks may be generated upon a user indicating a desire to view possible masks for an image. For example, a user may select or input a menu command, a mouse or touch input using a touch and/or click, lasso and/or marque tool and/or a voice input to "Show Selections," "Show Segments," or "Show Masks," or some combination thereof. Such an input can be performed using, for example, a touch screen, a stylus, a mouse, and/or a track pad.

The masks generated and/or presented may be determined, for example, based on input from a user, or in other cases, based on default configurations. For example, mask component 210 may enable a user to select a particular level of detail for the masks desired to be viewed. This level of masks can be based on how much detail the user wishes to observe for segmentation options. For instance, in a portrait of an individual, the image can be segmented into a segment of the individual's face and a segment of the background or, if more detail is desired, into segments of the individual's eyes, teeth, hair, etc. In an embodiment, the detail level can indicate the number of masks the user wishes to view: 1 for one mask, 2 for two masks, etc. In another embodiment, the detail level can be designated as low, medium, or high where low would include masks of larger image areas (e.g., just a foreground mask and a background mask) and high would include masks of smaller more detailed areas for editing smaller segments of the image (e.g., for a portrait, in addition to foreground and background, masks of eyes, teeth, hair, etc.). Such a detail level may be provided at the outset to determine for which image segmentations to generate masks. In other cases, masks may be generated for each image segmentation, and the detail level may be used to select which masks to present to a user.

A set of masks can be presented to the user using presentation component 212 allowing the user to visualize different portions of the image that localized edits can be applied to using masks. In this manner, multiple masks can be concurrently or simultaneously presented such that a user may select from among the masks to apply edits. Presenting multiple masks in this manner allows a user to visualize available masks in a single input rather than having to iteratively go through the step by step mask creation in order to select and edit different areas of an image. The user can select a mask from the presented masks to apply edits to the corresponding portion of the image based on the selection for which the mask was generated.

The set of masks can be presented to users in various manners. In an embodiment, such masks can overlay an image such that a user can visualize which mask corresponds to what portion of the image upon selection of a mask (e.g., via clicking a mask, mousing over a mask, etc.). The masks can be presented as a strip of thumbnails in a mask zone of a graphical user interface of an image editing system. Available masks can also be presented when a user interacts with a portion of an image for which a mask is available, for example, by clicking on a portion the user is interested in editing. In such presentations of masks, multiple nested masks can be available upon selecting a mask that contains portions of another mask(s) (e.g., selecting a mask of a person and being presented with nested masks of the person's face, and, further, the person's smile). In further embodiments, upon a user interaction with a portion of the image for which a mask is available, a thumbnail pop-up window can appear. The user can further interact with such a pop-up to select the available mask for making edits.

Upon selecting a mask to apply, modification component 214 can be used to apply edits to an image. For instance, a mask can be used to create different adjustment layers for applying edits such as levels, curves, hue and saturation, black and white, vibrance, color balance, etc. In this way, a user is provided an easy and intuitive way that the user can select masks to use from the list of available masks for image editing, adjustments, and/or composition. To this end, a mask can be selected and edits made to the corresponding portion of the image. Instead of having to go through the conventional method of the time-consuming step by step creation of a new mask to apply edits to another portion of the image, a user can simply select another mask from the presented masks for use in editing the image. That is, a user can select a second mask previously generated and presented to apply additional or alternative edits to the image.

In an embodiment, a user can select a mask representing a person in an image. Upon selecting the mask, a list of possible edit options can appear. These edit options can be used to edit the portion of the image as indicate by the selected mask, (e.g., the person). For instance, if hue and saturation is selected, the user can edit the portion of the image as indicated by the mask to make changes to the hue and saturation. Such edits to the image are capable of being displayed in an edit zone. These edits can appear in a manner that an individual edit operation can be returned to for further editing. In the case of editing hue and saturation of a person in an image, if upon applying later edits, the user decides that the saturation has been edited too much, the user can select the hue and saturation editing instance applied using the mask of the person from the applied edits. Selecting this editing instance will allow the user to make further hue and saturation edits to the person portion of the image.

Such masks can also be used in creating composite images. For example, a mask indicating a car in an image can be selected for editing. This car mask can then be exported as a new layer and composited with a new background to create a composite image. Additional edits can then be made to the composited image using additional editing operations. For instance, after generating the composite image, a user may wish to input additional edits to the appearance of the car. Such edits can include changing the brightness of the car, modifying the color of the car, etc. Each of these edits can be performed using the car mask so that the edits are applied to only the car portion of the image and not the overall composite image.

In embodiments, edits to an image can be made using a first mask using a first layer mask in a first layer and edits made using a second mask can be applied using a second layer mask in a second layer. In this way, edits made to an image are stacked as layers of edits applied using selected masks.

Figure 3A:
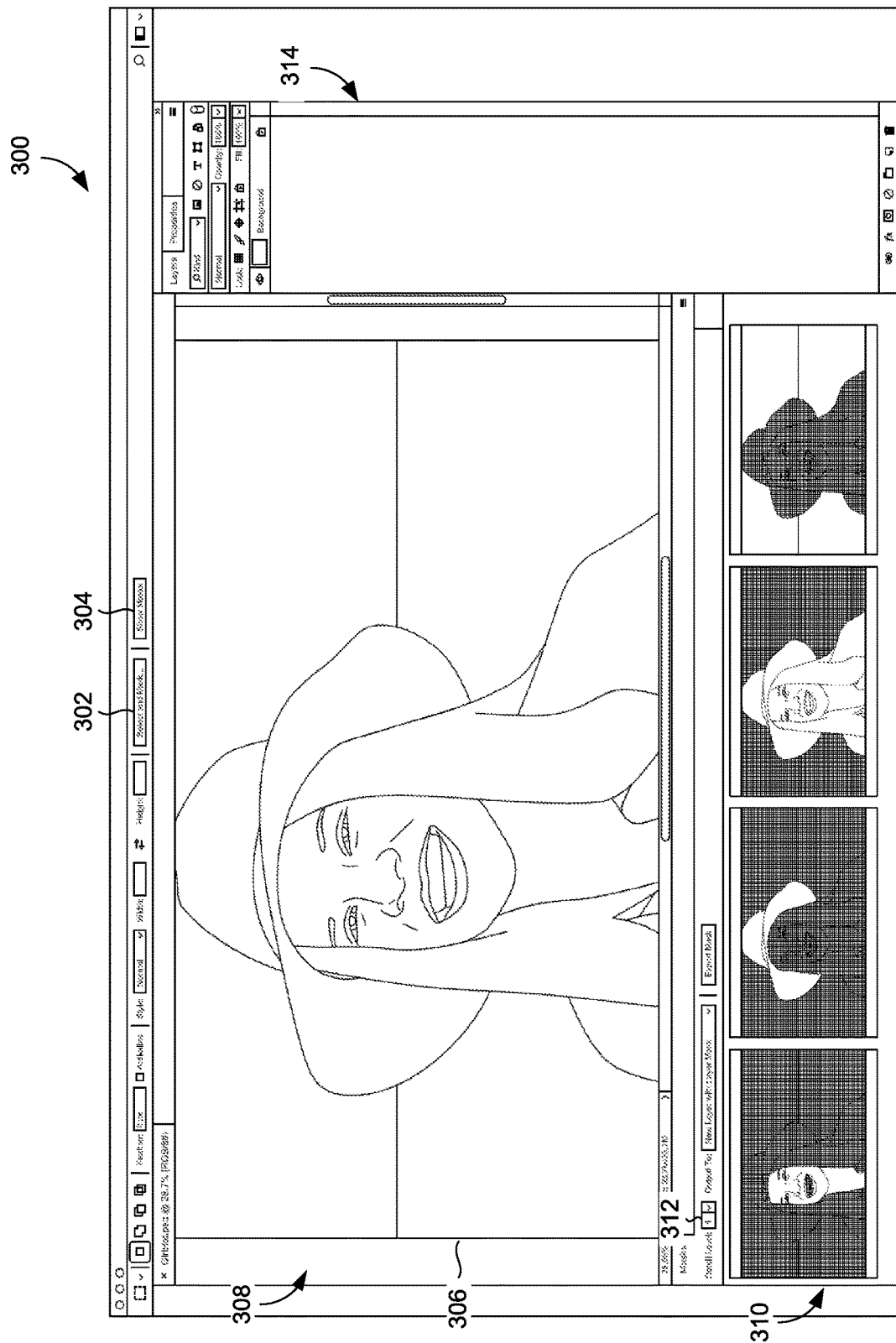
FIG. 3A depicts an illustrative image editing system for providing available masks for use in editing of an image, in accordance with embodiments of the present disclosure

FIGS. 3A-3E depict illustrative image editing systems for providing available masks for use in editing of an image, in accordance with embodiments of the present disclosure. FIG. 3A depicts a graphical user interface of image editing system 300 for presenting available masks for use in editing an image. Examples of such an image editing system can include Adobe® Photoshop®, LightRoom®, and the like. As illustrated, Select and Mask 302 can be selected to generate segmentations for image 306 displayed in display zone 308. Such segmentations can be generated using, for instance, a segmentation engine (e.g., segmentation engine 206 of image editing system 204). In embodiments, Select and Mask can be displayed as a selectable button. Such a Select and Mask button can be selected by a user by clicking on the button, using touch screen capabilities, vocally indicating a selection, and/or other methods of user device interaction. In further embodiments, Select and Mask need not have a visual component and can be applied using a vocal indication.

Upon completion of image segmentation, Show Masks 304 can be selected. Upon selecting Show Masks, multiple masks available for use can be displayed. In embodiments, Show Masks can be displayed as a selectable button. Such a Show Masks button can be selected by a user by clicking on the button, using touch screen capabilities, vocally indicating a selection, and/or other methods of user device interaction. In further embodiments, Show Masks need not have a visual component and can be applied using a vocal indication. Show Masks can also be a selection tool that allows a user to utilize multiple input methods such as single click, marquee, and/or lasso. Alternatively, upon selecting Show Masks, segmentation can automatically be triggered, removing the need for a Select and Mask interaction.

Upon the selection Show Masks, masks generated during segmentation can be displayed in mask zone 310 of the image editing system 300. Advantageously, such presentation of masks allows a user to see and visualize the different areas of image 306 available as possible selections or masks at one time without having to repeatedly go through step by step mask creation in order to select and edit different areas of the image. In one embodiment, as depicted in FIG. 3A, the masks can be presented in a horizontal strip of thumbnails in mask zone 310 with different visualization options (e.g., Marching Ants, Overlay, On Black, On White, and Black and White). It should be appreciated that such presentation is not limited to a horizontal positon and further embodiments can include vertical position, presentation in a pop-up window, in a new tab, etc.

The displayed masks can be based on a selected detail level 312. In an embodiment, the detail level can indicate the number of masks the user wishes to view: 1 for one mask, 2 for two masks, etc. In another embodiment, the detail level can be designated as low, medium, or high (or other designations) where low would include masks depicting less detailed portions of an image and high would include masks for editing smaller segments of the image. Although described as using numerals, or high/medium/low designations, as can be appreciated, detail level can be specified in any number of ways.

Image 306 can be edited using image editing system 300. Edits to the image can be displayed in edit zone 314. Edit zone 314 can indicate different layers of edits as well as any edits made to image 306. Such edits can include changes made to levels, curves, hue and saturation, black and white, vibrance, color balance, etc. The edit zone can also designate what layer an edit is applied to and/or the properties of an edit.

Figure 3B:
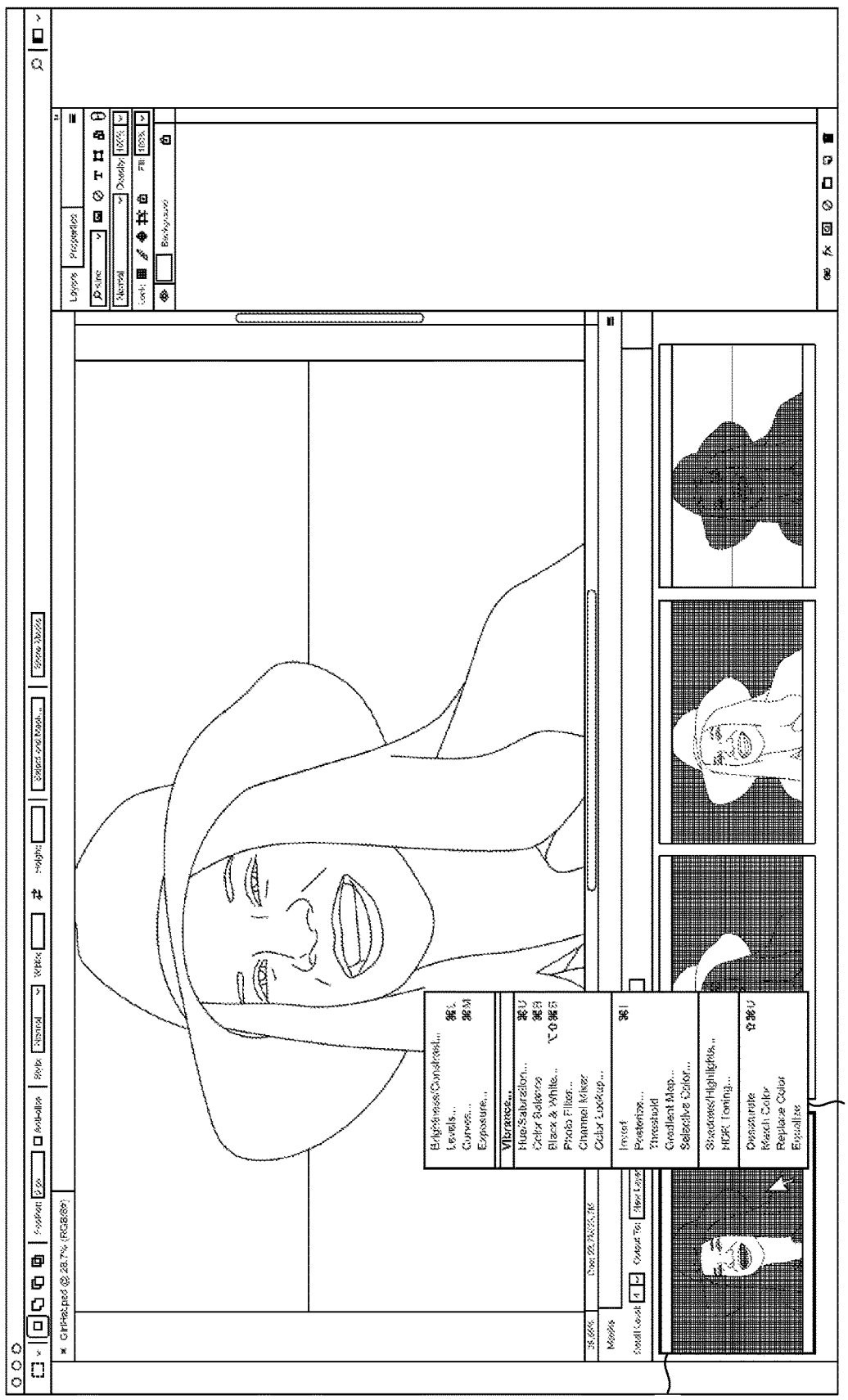
FIG. 3B depicts an illustrative image editing system for providing available masks for use in editing of an image, in accordance with embodiments of the present disclosure.

FIG. 3B depicts that when a user selects mask 316 from the available thumbnail masks, list 318 can be presented. List 318 includes available edit options a user can apply for the portion of the image corresponding to selected mask 316. Such a list can be tailored for the specific function of editing an image utilizing a selected mask. In embodiments, such a list can appear when a user right clicks on a mask, left clicks on a mask, uses touch screen capabilities, vocally indicates a selection, and/or other methods of user device interaction. List 318 can include various edit options, such as, for example, brightness/contrast, levels, curves, exposures, vibrance, hue/saturation, color balance, black & white, photo finish, channel mixer, color lookup, invert, posturize, threshold, corrective colorization, shadows/highlights, HDR toning, desaturate, match color, replace color, equalize, etc.

Figure 3C:
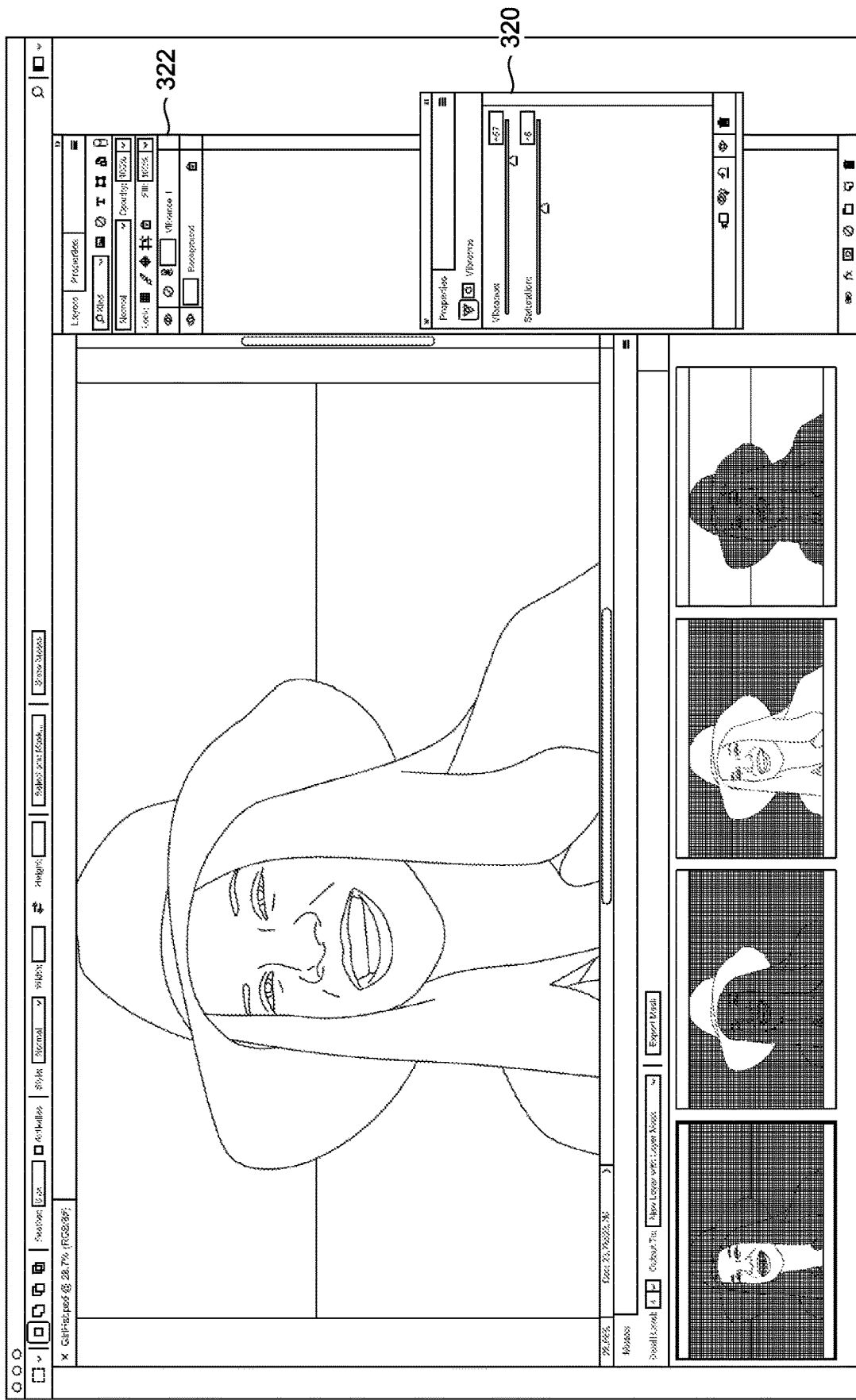
FIG. 3C depicts an illustrative image editing system for providing available masks for use in editing of an image, in accordance with embodiments of the present disclosure.

FIG. 3C depicts that when a user selects an available edit option from list 318, editing window 320 can appear. As depicted, a user selected the vibrance option from list 318 resulting in editing window 320. A user can utilize editing window 320 to edit the portion of the image corresponding to selected mask 316. As depicted, making edits using editing window 320 will change values associated with vibrance and/or saturation for the face/skin segment of the individual in the image. As edits are made to the image using selected masks, the edit zone can be updated to show the edits to the corresponding portions of the image. For instance, edit 322 indicates a vibrance edit was made. Displaying the edits using the edit zone allows a user to go back and make changes to those edits if desired.

FIG. 3D depicts that displaying multiple masks for selection allows a user to easily move from editing one portion of an image, using, for example, mask 316, to editing another area portion of the image, using, for example, mask 324. Such a mask can be used to create a new layer using a layer mask. Output to Selection 328 can be used to select how to apply an edit option to a selected mask. For instance, after selecting mask 324, Export Mask 330 can be selected to output mask 324 to a new layer as a layer mask. Such a layer can be seen in the edit zone as edit 332.

Figure 3E:
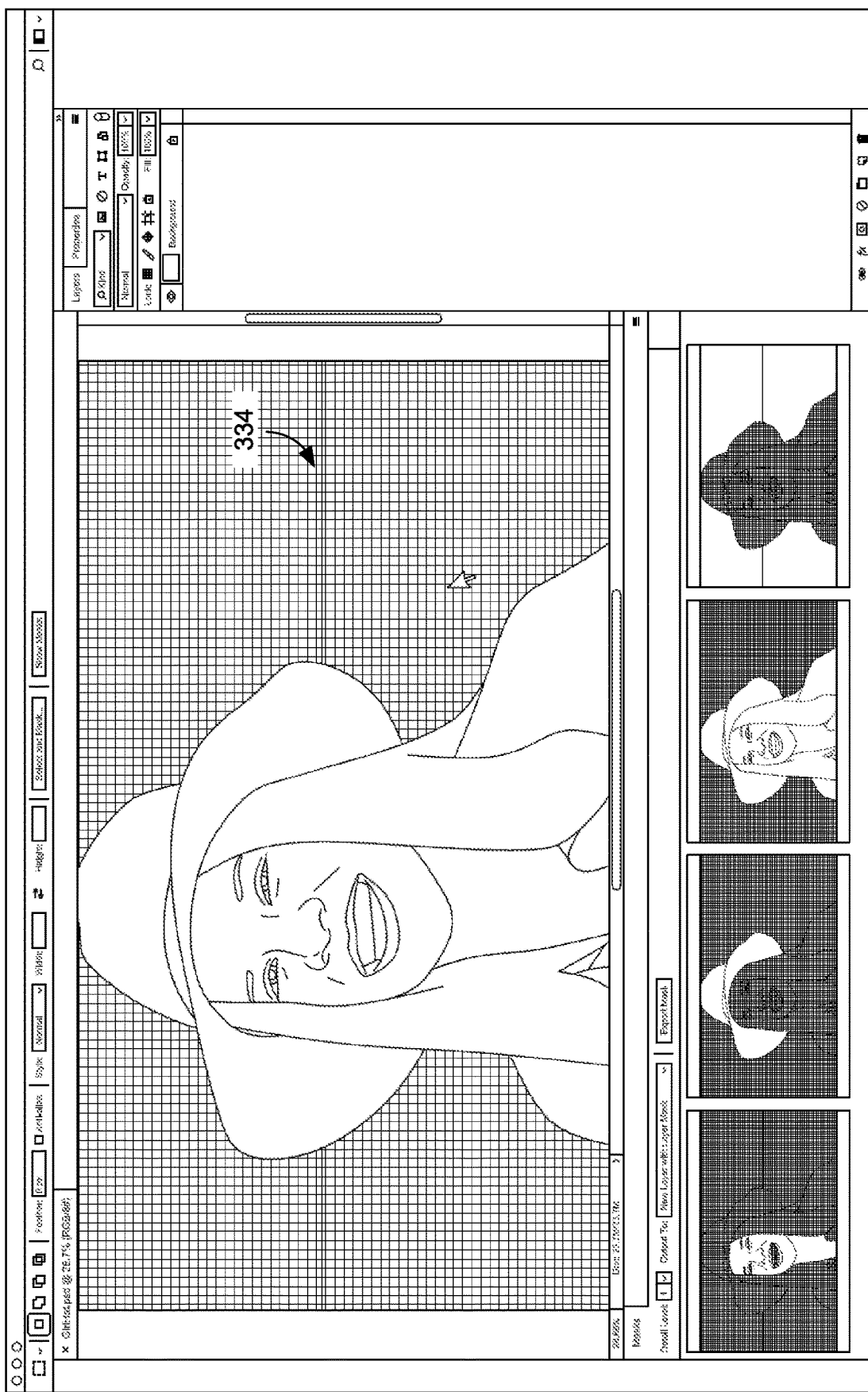
FIG. 3E depicts an illustrative image editing system for providing available masks for use in editing of an image, in accordance with embodiments of the present disclosure.

FIG. 3E depicts that upon selecting a mask from the mask zone, the selected mask can be displayed in the display zone for the image. Displayed mask 334 shows a full-size mask for the image as edits are made.

Figure 4:
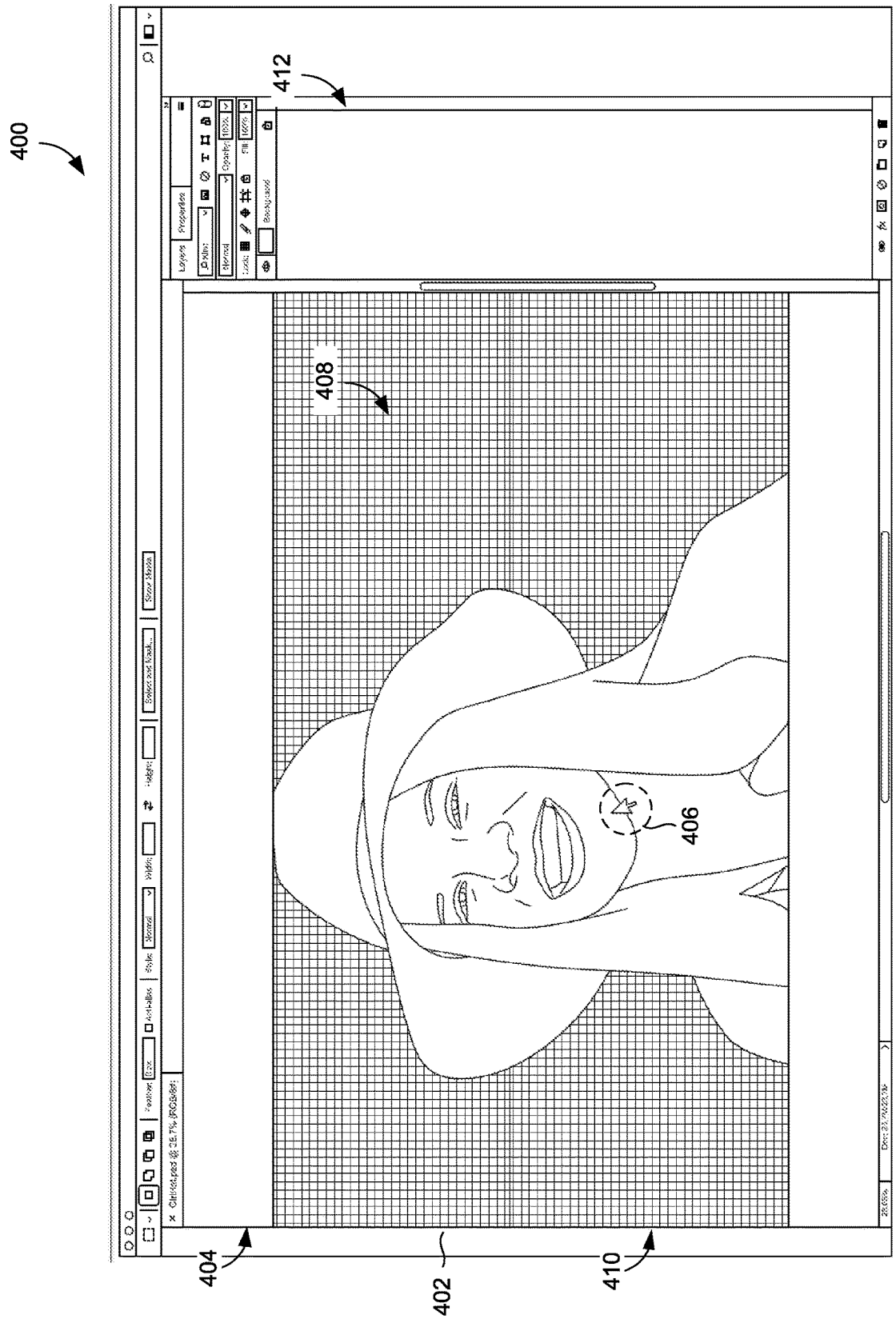
FIG. 4 depicts an illustrative image editing system for providing available masks for use in editing of an image based on user interaction with portions of the image, in accordance with embodiments of the present disclosure.

FIG. 4 depicts an illustrative image editing system for providing available masks for use in editing of an image, in accordance with embodiments of the present disclosure. Examples of such an image editing system can include Adobe® Photoshop®, LightRoom®, and the like. Select and Mask can be selected to generate segmentations for image 402 displayed in display zone 404. Such segmentations can be generated using, for instance, a segmentation engine (e.g., segmentation engine 205 of image editing system 204).

Upon selecting Show Masks, multiple masks can become available for display. Show Masks can be selected upon completion of image segmentation. Alternatively, selecting Show Masks can automatically trigger Select and Mask to generate the segmentations. Masks for visualizing the segments generated during segmentation can be presented to a user when the user interacts with a portion of image 402 for which a mask is available. As displayed, interaction 406 (e.g., clicking and/or mousing over the person in image 402) indicates that mask 408 for the foreground of image 402 is available for use in editing the image. User interaction can include mousing over a portion of an image that has an associated mask, clicking on a portion of an image that has an associated mask using a mouse, using touch screen capabilities, and/or other methods of user device interaction. Such user interactions can be input using, for example, using a touch screen, a stylus, a mouse, and/or a track pad. In further embodiments, instead of displaying an available mask in full-size over the image, upon a user interaction with a portion of the image for which a mask is available, a thumbnail pop-up window can appear. The user can further interact with such a pop-up to select the available mask for making edits.

When a mask has been selected, mask zone 410 can overlay display zone 404 so that the selected mask can be viewed. Further, a user can indicate that while performing edits to image 402 using selected mask 408, the user wishes to view the image without selected mask 408. This can be implemented, for example, by hiding the overlaid mask zone during the edits. Hiding the overlaid mask zone can be accomplished, for instance, by deselecting Show Masks. Edits to image 402 can be displayed in edit zone 412.

Figures 5, 6:
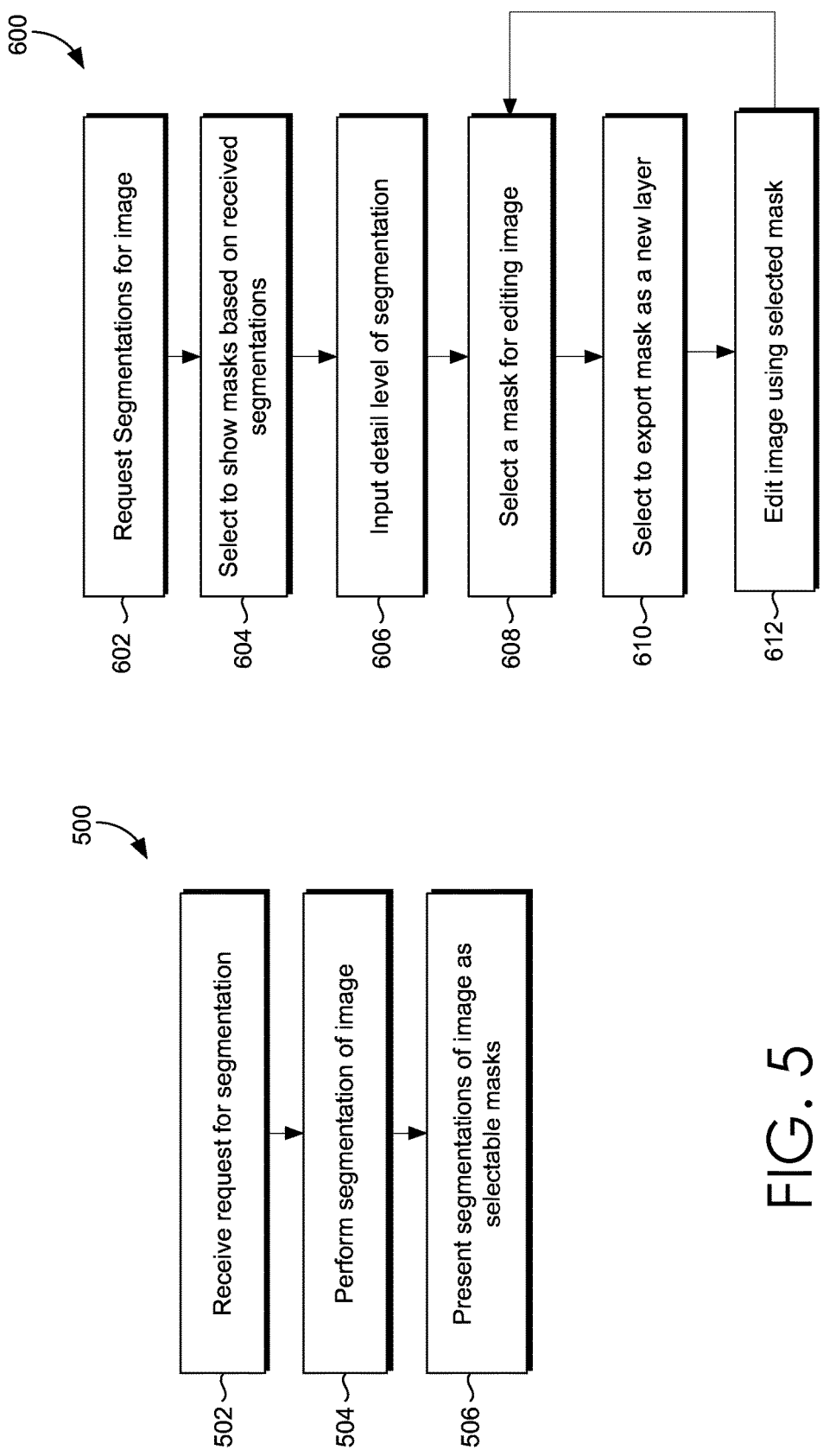
FIG. 5 illustrates a process flow showing an embodiment for performing segmentation of an image to generate masks for use in editing portions of the image, in accordance with embodiments of the present invention.
FIG. 6 illustrates an example method for utilizing a mask generated based on segmentation of an image for editing portions of the image, in accordance with embodiments of the present invention.

With reference to FIG. 5, a process flow is provided showing an embodiment of method 500 for performing segmentation of an image to generate masks for use in editing portions of the image, in accordance with embodiments of the present invention. Method 500 can be performed, for example by segmentation engine 206 of image editing system 204, as illustrated in FIG. 2.

At block 502, a request is received for segmentation of a selected image. Such an image can be selected from a group of images stored in a database, such as data store 202 of FIG. 2. Image segmentation is the process of partitioning an image into multiple segments. Segments can be created along boundaries within an image and/or used to designate objects and/or features within the image. Such a segment can be visualized in an editing environment using a mask that indicates the segmented portion of an image to which edits will be applied as opposed to the portions of the image that will not be affected by edits.

At block 504, segmentation of the image can be performed. Such segmentation can be performed using any number of techniques. Such techniques include deep learning techniques, color range or saliency detection, thresholding, clustering methods, compression-based methods, histogram-based methods, edge detection, dual clustering methods, region-growing methods, partial differential equation-based methods, variational methods, graph partitioning methods, watershed transformation, model based segmentation, multi-scale segmentation, and semi-automatic segmentation. Specifically, the deep learning techniques can include instance-level semantic segmentation as described in U.S. application Ser. No. 15/296,845, automatic boundary-aware human cutout as described in U.S. application Ser. No. 15/0886,590, object detection using cascaded convolutional neural networks as described in U.S. Pat. No. 9,418,319, all of which are incorporated by reference, generic algorithms for segmentation such as R-CNN and/or mask R-CNN.

At block 506, the segments as generated at block 504, can be presented as selectable masks. Presentation of multiple generated masks allows a user to see and visualize the different areas of an image available as possible selections or masks at one time without having to repeatedly go through step by step mask creation in order to select and edit different areas of the image. In one embodiment, the masks can be presented in a strip of thumbnails in a mask zone with different visualization options (e.g., Marching Ants, Overlay, On Black, On White, and Black and White). In another embodiment, an available mask can be presented when a user interacts with a portion of an image for which a mask is available, for example, by clicking on a portion the user is interested in editing. In further embodiments, upon a user interaction with a portion of the image for which a mask is available, a thumbnail pop-up window can appear. The user can further interact with such a pop-up to select the available mask for making edits.

FIG. 6 illustrates an example process flow 600 for utilizing a mask generated based on segmentation of an image for editing portions of the image, in accordance with embodiments of the present invention. At block 602, a request for segmentations for an image can be sent. Such a request can be sent, for example, by editing engine 208 to segmentation engine 206, as depicted in FIG. 2.

At block 604, an indication to select to show masks based on received segmentation can be received. In embodiments, such a selection can be indicated using a Show Masks button. In further embodiments, Show Masks need not have a visual component and can be applied using a vocal indication. Show Masks can also be a selection tool that allows a user to utilize multiple input methods such as single click, marquee, and/or lasso. Upon receiving such an indication, multiple masks available for use can be presented. The masks can be presented as a strip of thumbnails in a mask zone of a graphical user interface of an image editing system. Available masks can also be presented when a user interacts with a portion of an image for which a mask is available, for example, by clicking on a portion the user is interested in editing. In further embodiments, upon a user interaction with a portion of the image for which a mask is available, a thumbnail pop-up window can appear. The user can further interact with such a pop-up to select the available mask for making edits.

At block 606, input can be received indicating a desired detail level of segmentation. This level of masks can be based on how much detail a user wishes to observe for segmentation options. For instance, in a portrait of an individual, the image can be segmented into a segment of the individual's face and a segment of the background or, if more detail is desired, into segments of the individual's eyes, teeth, hair, etc. In an embodiment, the detail level can indicate the number of masks the user wishes to view: 1 for one mask, 2 for two masks, etc. In another embodiment, the detail level can be designated as low, medium, or high where low would include masks for less detailed objects from an image and high would include masks for editing more detailed objects using smaller segments of the image.

At block 608 a mask can be selected for use in editing an image. When a user selects a mask from the available masks, a list of possible edit options can be presented. In embodiments, such a list can appear when a user right clicks on a mask, left clicks on a mask, uses touch screen capabilities, vocally indicates a selection, and/or other methods of user device interaction.

At block 610, a selected mask, such as that at block 608, can be selected to export as a new layer. A layer is used to describe the different levels at which a user can edit an image in an image editing application. A user can stack, merge, and/or define layers when editing a digital image. Layers can be used to allow portions of images within a layer to be shown in a selected manner (e.g., with a selected editing process applied). Layers also allow users to be able to combine two or more images into a single image. Using layers when editing an image can allow a user to continually make changes and/or edits within a layer during the editing process without affecting other layers of the image. Such a layer can be seen in an edit zone of a graphical user interface of an image editing system. Different adjustment layers include levels, curves, hue and saturation, black and white, vibrance, color balance, etc. In this way, a user is provided with an easy and intuitive way that the user can use the list of available masks for image editing, adjustments, and/or composition.

At block 612, the image can be edited using the selected mask. Current editing manipulations can be displayed the editing zone graphical user interface of an image editing system. Such edits can include changes made to levels, curves, hue and saturation, black and white, vibrance, color balance, etc.

Upon completing edits using a selected mask at block 612, the process flow can return to block 608 and another presented mask can be selected, repeating the editing process without requiring additional segmentation to be performed. It should also be appreciated that not all masks selected at block 608 need to be exported as a new layer, as in block 610. In some embodiments, the process at block 610 can be skipped and multiple edits can be made in the same layer using different masks to apply edits to corresponding portions of an image.

Figure 7:
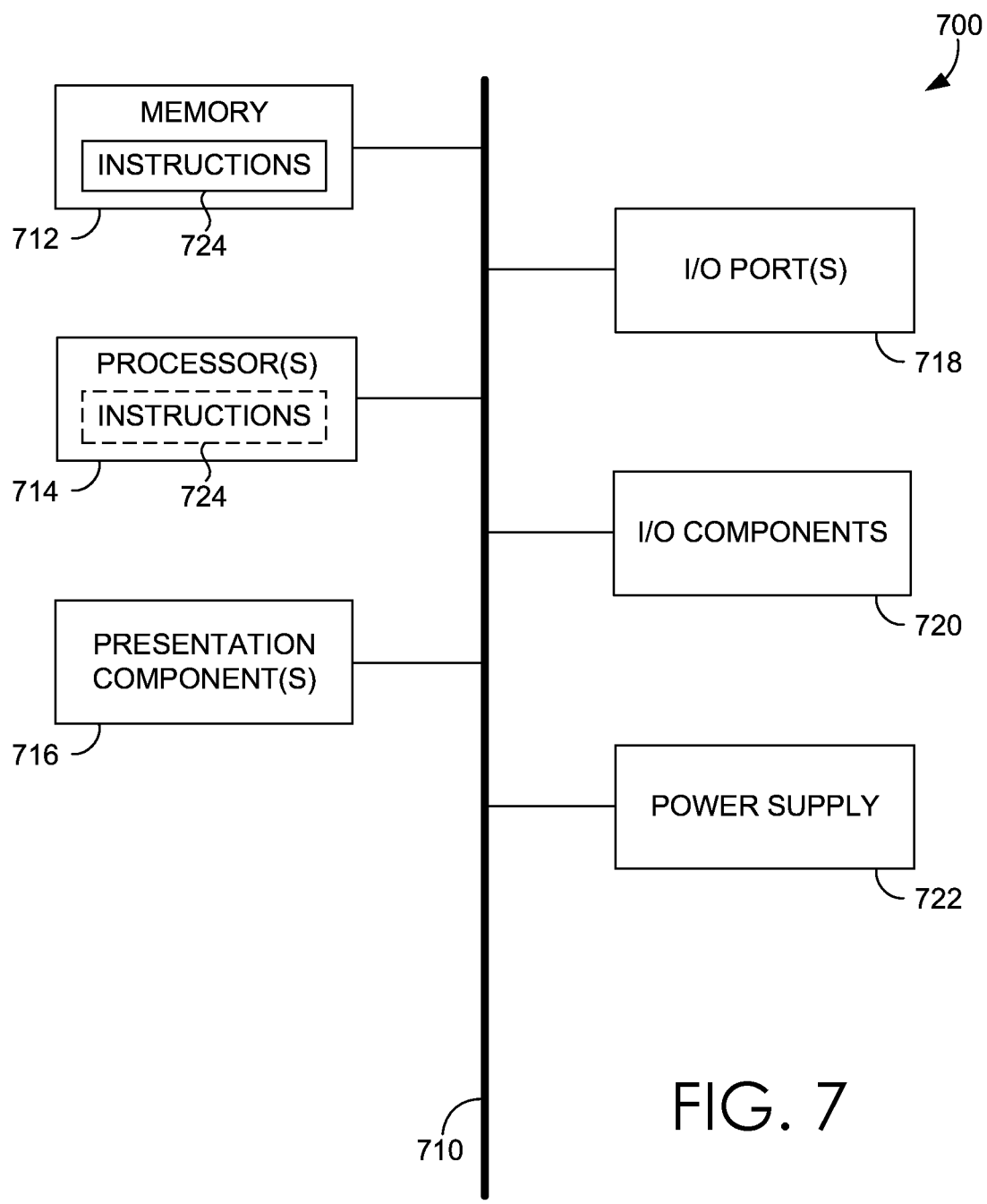
FIG. 7 is a block diagram of an example computing device in which embodiments of the present disclosure may be employed.

Having described embodiments of the present invention, FIG. 7 provides an example of a computing device in which embodiments of the present invention may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method implemented by a computing device, the method comprising:
   generating, by the computing device, a plurality of masks, each said mask segmenting a single image into a respective editable portion of a plurality of editable portions from the single image;
   displaying, by the computing device, the plurality of masks separately and concurrently in a user interface as segmenting the single image into the plurality of editable portions;
   receiving, by the computing device, a selection of at least one said mask via the user interface;
   exporting, by the computing device, the selected at least one said mask as a layer; and
   displaying, by the computing device in the user interface upon the selection, the layer as including a respective said editable portion of the selected at least one said mask.

2. The method of claim 1, further comprising automatically generating, by the computing device, multiple nested masks containing the respective portions of the respective editable portion of the at least one said mask.

3. The method of claim 2, wherein the automatically generating the multiple nested masks is performed upon the selection of the at least one said mask.

4. The method of claim 1, wherein the plurality of masks are based on a user selected segmentation detail level.

5. The method of claim 1, wherein the plurality of masks appears via the user interface upon a user interaction with a respective portion of the single image.

6. The method of claim 1, wherein at least two masks of the plurality of masks correspond to a same layer of a plurality of layers that form the single image.

7. The method of claim 1, wherein the segmenting the single image is performed utilizing at least one of deep learning techniques, color range detection, saliency detection, thresholding, clustering methods, compression-based methods, histogram-based methods, edge detection, dual clustering methods, region-growing methods, partial differential equation-based methods, variational methods, graph partitioning methods, watershed transformation, model based segmentation, multi-scale segmentation, and semi-automatic segmentation.

8. The method of claim 1, wherein the displaying the plurality of masks separately and concurrently in the user interface as segmenting the single image into the plurality of editable portions includes the single image.

9. A system comprising:
   one or more processors; and
   a computer-readable medium storing instructions that causes the one or more processors to perform operations including:
      receiving an input specifying a segmentation detail level;
      generating a plurality of masks, each said mask segmenting a single image into a respective editable portion of a plurality of editable portions from the single image based on the segmentation detail level;
      displaying the plurality of masks in a user interface as segmenting the image into the plurality of editable portions;
      receiving a selection of at least one mask of the plurality of masks; and
      exporting the selected mask as a layer of a plurality of layers that form the image.

10. The system of claim 9, the operations further comprising:
    receiving a selection of at least one said mask via the user interface; and
    displaying, in the user interface upon the selection, multiple nested masks containing respective portions of the respective editable portion of the at least one said mask.

11. The system of claim 10, the operations further comprising automatically generating the multiple nested masks containing the respective portions of the respective editable portion of the at least one said mask.

12. The system of claim 9, wherein the displaying of the plurality of masks is performed separately and concurrently in the user interface.

13. The system of claim 9, wherein the plurality of masks are based on a user selected segmentation detail level.

14. The system of claim 9, wherein at least one said mask appears via the user interface upon a user interaction with a respective portion of the single image.

15. The system of claim 9, the operations further comprising:
    receiving a selection of masks from the plurality of masks via the user interface;
    receiving an indication of an edit to the respective editable portions of the selected masks;
    applying the edit to the respective editable portions of the selected masks; and
    displaying the single image having the edit to the respective editable portions.

16. The system of claim 9, the level of detail indicating a number of masks to be generated or how much detail.

17. A method implemented by a computing device, the method comprising:
    generating, by the computing device, a plurality of masks, each said mask segmenting a single image into a respective editable portion of a plurality of editable portions from the single image;
    displaying, by the computing device, the plurality of masks separately and concurrently in a user interface as segmenting the single image into the plurality of editable portions, at least two said masks corresponding to a same layer of a plurality of layers;

receiving, by the computing device, a selection of at least one said mask via the user interface;

generating, by the computing device upon the selection, a foreground layer from the at least one mask;

compositing, by the computing device, the foreground layer with a background; and displaying, by the computing device, the foreground layer with the background in the user interface.

18. The method of claim 17, further comprising:

receiving a selection of at least one said mask via the user interface; and displaying, in the user interface upon the selection, multiple nested masks containing respective portions of the respective editable portion of the at least one said mask.

19. The method of claim 17, further comprising:

receiving a selection of masks from the plurality of masks via the user interface;

receiving an indication of an edit to the respective editable portions of the selected masks; and applying the edit to the respective editable portions of the selected masks.

20. The method of claim 17, further comprising receiving an input specifying a segmentation detail level and wherein the generating the plurality of masks is based at least in part on the segmentation detail level.

* * * * *